United States Patent [19]

Eddleman

[11] Patent Number: 4,828,706
[45] Date of Patent: May 9, 1989

[54] PROCESS FOR PERFORMING A DIALYSIS OPERATION

[75] Inventor: Roy T. Eddleman, Los Angeles, Calif.

[73] Assignee: Spectrum Medical Industries, Los Angeles, Calif.

[21] Appl. No.: 164,839

[22] Filed: Mar. 7, 1988

[51] Int. Cl.⁴ .............................................. B01D 13/00
[52] U.S. Cl. .................................. 210/644; 210/242.1
[58] Field of Search ........... 210/242.1, 321.67, 321.23, 210/644; 52/170; 294/66.1; 128/346

[56] References Cited

U.S. PATENT DOCUMENTS

| | | | |
|---|---|---|---|
| 3,904,235 | 9/1975 | Fehr | 294/66.1 X |
| 3,939,665 | 2/1976 | Gosse et al. | 52/170 X |
| 4,144,165 | 3/1979 | Matz | 210/644 |
| 4,450,076 | 5/1984 | Medicus et al. | 210/242.1 |
| 4,557,262 | 12/1985 | Show | 128/346 X |

Primary Examiner—Frank Spear
Attorney, Agent, or Firm—Edgar W. Averill, Jr.

[57] ABSTRACT

A process for performing a dialysis operation. The operation is carried out by snapping a weighted clamp on one end of a length of dialysis tubing. The dialysis tubing is then filled with a liquid to be treated and an unweighted clamp is snapped on the other end thereof. The assembly is then suspended in a dialysis bath thereby floating in a generally vertical position.

4 Claims, 1 Drawing Sheet

PROCESS FOR PERFORMING A DIALYSIS OPERATION

BACKGROUND OF THE INVENTION

The field of the invention is dialysis procedures and the invention relates more particularly to the type of dialysis that is carried out in a tubular membrane.

The process of dialysis is well known and involves the placing of a sample on one side of a membrane and a solvent on the other side of the membrane. Solutes of a small size which are small enough to pass through the wall of the dialysis membrane will pass from the sample to the solvent whereas the larger solutes, or macro solutes, will not be capable of passing through the dialysis membrane and, thus, will remain in the sample. By such a process, micro solutes, such as salts, may be removed from a sample by dialysis.

Dialysis tubing has been used to carry out this operation and typically one end of the tubing is clamped with a clamp of the type shown in U.S. Pat. No. 3,874,042. This permits the easy filling of a length of tubing and in the past various means were used such as the placing of one or more marbles inside the tubing to weight one end thereof. The clamps of the type shown in U.S. Pat. No. 3,874,042 are typically lighter than the dialysis bath and, thus, tend to float therein. This does not optimize the processing since it is advantageous to maintain the tubing in a vertical manner near the center of the dialysis bath so that the concentration on the outer surface of the membrane will remain low in that salts, and the like, passing through the dialysis tubing will readily be diffused in the bath.

SUMMARY OF THE INVENTION

It is an object of the present invention to provide a simple process for suspending a length of dialysis tubing in a dialysis bath.

The present invention is for a process for performing a dialysis operation comprising the steps of snapping a weighted clamp on one end of a length of dialysis tubing, the weighted clamp having a net density sufficient so that it will sink in a dialysis bath. Next, the length of tubing is filled with the liquid to be treated. Next, an unweighted clamp is snapped on the other end of the tubing to capture the sample of liquid to be treated. The captured sample is then placed in a dialysis bath of a depth greater than the length of the tubing whereby the sample will float in a vertical direction with the weighted clamp against the bottom of the sample and the unweighted clamp vertically suspended in the dialysis bath.

DESCRIPTION OF THE PREFERRED EMBODIMENTS

Figure 1:
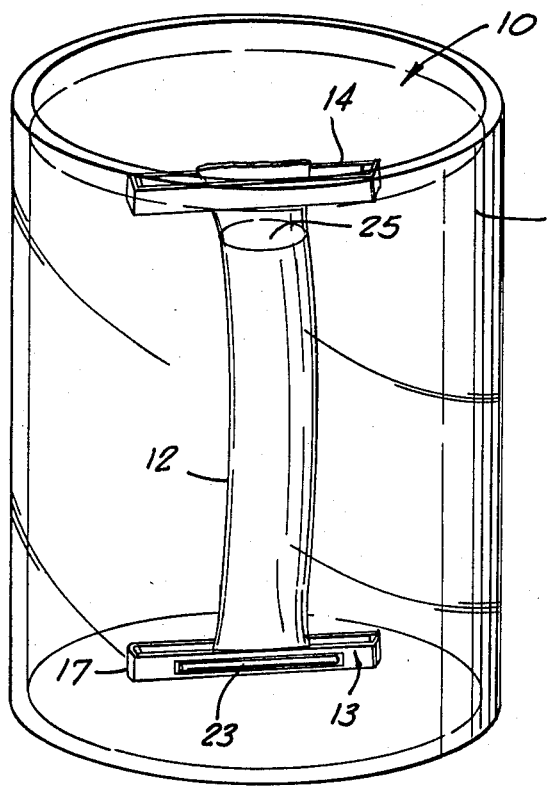
FIG. 1 is a perspective view showing the final step of the dialysis process.

A dialysis bath 10 is confined in a container 11. A length of dialysis tubing 12 has a weighted clamp indicated generally by reference character 13 at the lower end thereof. An unweighted clamp 14 is clamped on the upper end of the length of dialysis tubing 12.

Dialysis tubing 12 is typically formed from a cellulosic material such as regenerated cellulose derived from cotton linters. Such tubing forms a molecular sieve and is available with pores of controlled dimensions. Such pores permit micro solutes to pass therethrough and do not permit macro solutes to pass therethrough. The size of the pores determines what solutes pass through the membrane and appropriate pore size would be selected depending upon the size of solute to be removed.

Figure 5:
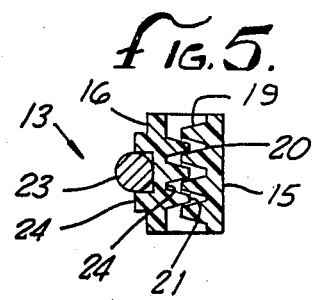
FIG. 5 is a cross-sectional view taken along line 5—5 of FIG. 3.
Figure 2:
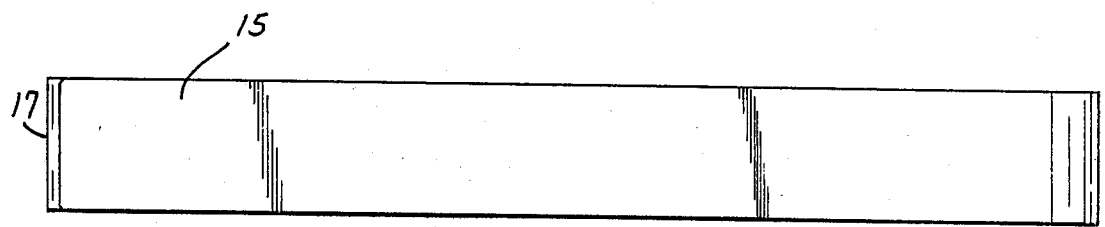
FIG. 2 is an enlarged plan view of one side of the weighted clamp of the process of the present invention.
Figure 3:
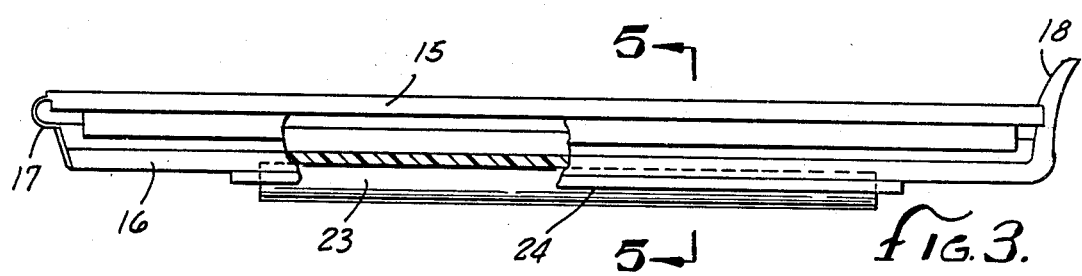
FIG. 3 is a side view of the clamp of FIG. 2 partially broken away.
Figure 4:
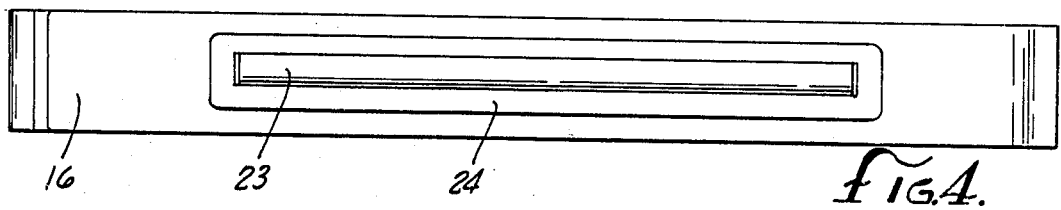
FIG. 4 is a bottom view of the clamp of FIG. 2.

The clamp shown in the drawings is generally of the type shown in U.S. Pat. No. 3,874,042. The clamp has an upper half 15, a lower half 16, a hinge 17 and a clasp 18. Upper half 15 has a plurality of ridges 19 shown in FIG. 5 and a plurality of valleys 20 are positioned between ridges 19. Similarly, lower half 16 has a plurality of ridges 21 with valleys 22 therebetween. As shown in FIG. 5, ridges 19 fit in valleys 22 and ridges 21 fit in valleys 20 to provide a secure grip on the dialysis tubing 12.

The polymer from which the clamp is formed should have a density less than that of dialysis bath 10. This will cause an unweighted clamp to float in the bath 10. Weighted clamp 13 has a stainless steel wire 23 held in a groove formed by a ridge 24 molded in lower half 16. Wire 23 may be glued, or snapped or molded in place but should be securely held to clamp 13. Since the polymer from which clamp 13 is made is lighter in density than the dialysis bath, it is necessary for the length of wire 23 to be sufficient in weight so that the net density of the polymer and wire is greater than that of the dialysis bath with which the clamp is to be used. In this way, the weighted clamp will sink in the dialysis bath.

The process of the present invention thus involves the step of snapping a weighted clamp 13 over one end of a length of dialysis tubing 12. Next, the sample 25 is poured into the other end of the length of tubing 12 and unweighted clamp 14 is snapped at the other end. The captured sample 25 in the length of dialysis tubing 12 is then placed in a dialysis bath 10. Bath 10 should be sufficiently deep so that the length of tubing 12 can be suspended in a generally upright configuration within the bath. In this way, there are no folds or other impediments to the free dispersion of micro solutes in the dialysis bath once they have passed through the membrane.

The process of the present invention provides a particularly simple and effective manner for carrying out a dialysis process. The treated sample may be readily removed after dialysis simply by removing the clamp and tubing assembly, draining the excess dialysis bath from the outside of the membrane and removing the top closure thereby permitting the sample to be poured out. The materials to carry such process are relatively inexpensive and the process is essentially free of any operator error.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A process for performing a dialysis operation comprising the steps of:

snapping a first clamp on one end of a length of dialysis tubing and the other of said first and second clamps being a weighted clamp;

filling the length of tubing with a liquid sample to be treated;

snapping a second clamp on the other end of said length of dialysis tubing, one of said first or second clamp having a net density sufficiently low so that it will float in a dialysis bath;

placing the resulted clamp tubing in a dialysis bath deeper than the length of said length of dialysis tubing thereby causing it to float in a vertical manner in said dialysis bath; and waiting a sufficient time for dialysis to take place.

2. The process of performing a dialysis operation of claim 1 wherein said weighted clamp comprises a clamp made from a polymer having a density lighter than the dialysis bath and having a weight affixed thereto.

3. The process of performing a dialysis operation of claim 2 wherein said weight is a length of stainless steel wire.

4. The process of performing a dialysis operation of claim 3 wherein said length of stainless steel wire is captured in a recess formed in the outer surface of said polymeric clamp.

* * * * *